United States Patent [19]
Sugimoto et al.

[11] Patent Number: 6,155,504
[45] Date of Patent: *Dec. 5, 2000

[54] FUEL INJECTOR FOR AN INTERNAL COMBUSTION ENGINE

[75] Inventors: Tomojiro Sugimoto, Susono; Keiso Takeda, Mishima, both of Japan

[73] Assignees: Toyota Jidosha Kabushiki Kaisha, Toyota; Aisan Industry Co., Ltd., Obu, both of Japan

[*] Notice: This patent issued on a continued prosecution application filed under 37 CFR 1.53(d), and is subject to the twenty year patent term provisions of 35 U.S.C. 154(a)(2).

[21] Appl. No.: 09/404,822

[22] Filed: Sep. 24, 1999

[30] Foreign Application Priority Data

Sep. 29, 1998 [JP] Japan .................................. 10-275339

[51] Int. Cl.[7] .................................................. F02M 61/16
[52] U.S. Cl. ................. 239/596; 239/533.12; 239/533.9; 239/533.3
[58] Field of Search ............................... 239/596, 533.12, 239/533.9, 533.3, 533.2, 585.1

[56] References Cited

U.S. PATENT DOCUMENTS

| | | | |
|---|---|---|---|
| 4,591,099 | 5/1986 | Emory et al. ........................ | 239/596 X |
| 5,109,823 | 5/1992 | Yokoyama et al. ............ | 239/533.12 X |
| 5,109,824 | 5/1992 | Okamoto et al. ............... | 239/533.12 X |
| 5,244,154 | 9/1993 | Buchholz et al. . | |
| 5,346,137 | 9/1994 | Okamoto et al. . | |
| 5,484,108 | 1/1996 | Nally . | |
| 6,070,811 | 6/2000 | Takeda et al. ...................... | 239/533.12 |

FOREIGN PATENT DOCUMENTS

| | | | |
|---|---|---|---|
| 827772 | 5/1938 | France ............................... | 239/533.12 |
| 3-78562 | 4/1991 | Japan . | |
| 5-272432 | 10/1993 | Japan . | |
| 8-319835 | 12/1996 | Japan . | |
| 9488 | 5/1923 | Netherlands ....................... | 239/533.12 |
| 400836 | 11/1933 | United Kingdom .............. | 239/533.12 |

*Primary Examiner*—Lesley D. Morris
*Attorney, Agent, or Firm*—Oliff & Berridge, PLC

[57] ABSTRACT

In a fuel injector for an internal combustion engine having a tip portion which is separate from the injector body and in which a slit-like injection hole and a downstream portion of fuel reservoir communicated with the injection hole are formed, joining surfaces of the tip portion and the injector body being joined to each other, the fuel reservoir being positioned downstream of a seat portion of valve body, an upstream portion of the fuel reservoir being formed in the injector body, a first opening of the downstream portion of the fuel reservoir in the joining surface of the tip portion being chamfered, and the first opening being larger than a second opening of the upstream portion of the fuel reservoir in the joining surface of the injector body such that the first opening surrounds the second opening.

9 Claims, 3 Drawing Sheets

FUEL INJECTOR FOR AN INTERNAL COMBUSTION ENGINE

BACKGROUND OF THE INVENTION

1. Field of the Invention

The present invention relates to a fuel injector for an internal combustion engine.

2. Description of the Related Art

Japanese Unexamined Patent Publication No. 3-78562 discloses a fuel injector in which the injection hole is made slit-like. The injection hole has an almost uniform relatively small height and a width which is gradually narrowed inward at a predetermined included angle. Therefore, the injected fuel therefrom becomes a spray in a flat triangular shape which has a relative small thickness. Such a fuel spray of a flat fan shape can be favorably atomized and mixed as nearly all of the fuel comes into sufficient contact with the air. In the fuel injector, the injection hole is communicated directly with a fuel reservoir downstream of the seat portion of the valve body, and the fuel is injected through the injection hole as the pressure of fuel within the fuel reservoir is increased.

The height, width, and included angle in the slit-like injection hole are important to define the fuel spray shape. To form a desired shape fuel spray, the injection hole must be made very precisely. A laser system and the like is usually used to make a slit-like injection hole. However, such a making of the injection hole is not easy and thus many production failures can occur.

Accordingly, if the injection hole is directly made in the injector body, many injector bodies in which a production failure occurs must be thrown away. This causes the yield of injector body, which is relatively expensive, to deteriorate and the manufacturing cost of the fuel injector to increase considerably. To solve these problems, a tip portion of the injector body is separate from the injector body, and the downstream portion of the fuel reservoir and the injection hole can be formed in the tip portion. Therefore, even if a production failure of the injection hole in the tip portion occurs, only the tip portion must be thrown away prior to mounting to the injector body, and thus the manufacturing cost of the fuel injector does not increase considerably.

However, when the tip portion is separate from the injector body, a slight deviation of the tip portion in mounting to the injector body causes the downstream portion of the fuel reservoir formed in the tip portion to not correspond to the upstream portion thereof formed in the injector body, and a step portion is formed within the fuel reservoir. When fuel flows from the upstream portion of the fuel reservoir to the downstream portion thereof, fuel impinges to the step portion within the fuel reservoir.

In the step portion side within the fuel reservoir, a turbulent flow of fuel is produced as the fuel impinges to the step portion, and the pressure of fuel within the downstream portion of the fuel reservoir becomes low. Therefore, even if the injection hole is favorably formed, depending on the position of the step portion, a uniform pressure of fuel does not act all over the injection hole and thus a desired fuel spray cannot be formed.

SUMMARY OF THE INVENTION

Therefore, an object of the present invention is to provide a fuel injector for an internal combustion engine having a tip portion which is separate from the injector body and in which a slit-like injection hole and a downstream portion of the fuel reservoir communicated with the injection hole are formed, the joining surfaces of the tip portion and the injector body being joined each other, which can form a desired shape fuel spray even if the tip portion deviates slightly when mounted to the injector body.

According to the present invention, there is provided a fuel injector for an internal combustion engine having a tip portion which is separate from the injector body and in which a slit-like injection hole and a downstream portion of fuel reservoir communicated with the injection hole are formed, the joining surfaces of the tip portion and the injector body being joined each other, wherein the fuel reservoir is positioned downstream of a seat portion of valve body, an upstream portion of the fuel reservoir is formed in the injector body, a first opening of the downstream portion of the fuel reservoir in the joining surface of the tip portion is chamfered, and the first opening is made larger than a second opening of the upstream portion of the fuel reservoir in the joining surface of the injector body such that the first opening surrounds the second opening.

The present invention will be more fully understood from the description of preferred embodiments of the invention set forth below, together with the accompanying drawings.

DESCRIPTION OF THE PREFERRED EMBODIMENT

Figure 1:
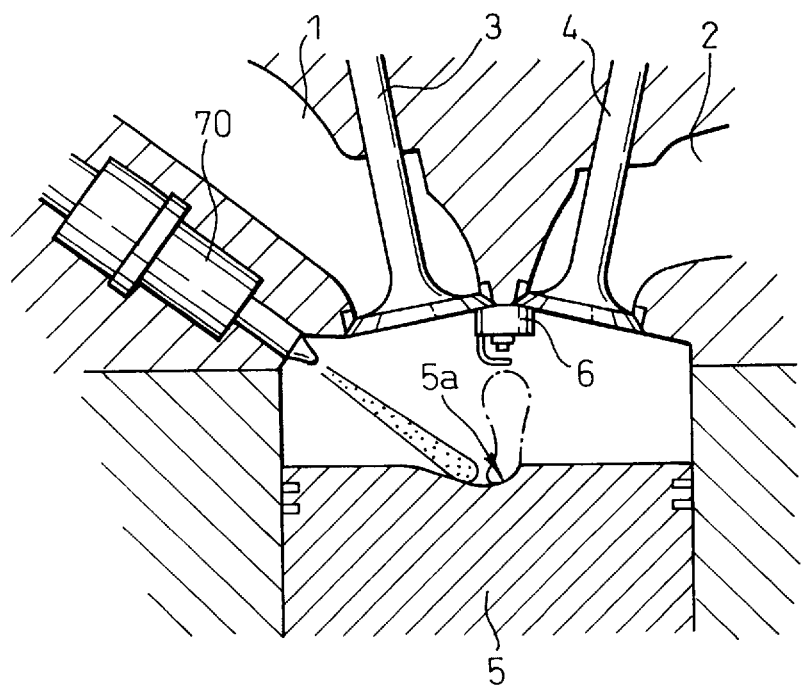
FIG. 1 is a sectional view schematically illustrating a part of a direct cylinder injection-type spark-ignition internal combustion engine equipped with a fuel injector according to a first embodiment of the present invention.

FIG. 1 is a sectional view schematically illustrating a part of a direct cylinder injection-type spark-ignition internal combustion engine equipped with a fuel injector 70 according to a first embodiment of the present invention. In FIG. 1, reference numeral 1 denotes an intake port and 2 denotes an exhaust port. The intake port 1 is communicated with the cylinder via an intake valve 3, and the exhaust port 2 is communicated with the cylinder via an exhaust valve 4. Reference numeral 5 denotes a piston, and 6 denotes a spark plug arranged on the upper portion of the cylinder. The fuel injector 70 directly injects the fuel, into the cylinder, to be directed toward the upper surface of the piston 5 in a later half of a compression stroke. On the upper surface of the piston 5, a deflection groove 5a is formed to deflect the fuel injected from the fuel injector 70 to the vicinity of the spark plug 6.

Figure 2:
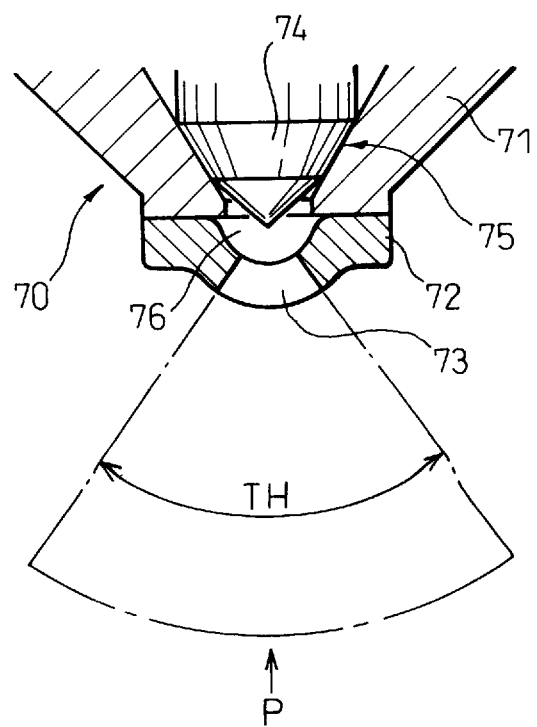
FIG. 2 is an enlarged sectional view illustrating the vicinity of an injection hole of the fuel injector according to the first embodiment.
Figure 3:
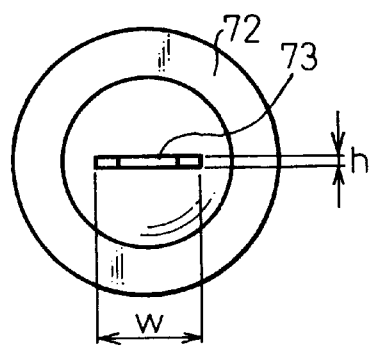
FIG. 3 is an view of part of FIG. 2 viewed from the direction of arrow (P)

FIG. 2 is an enlarged sectional view illustrating the vicinity of an injection hole of the fuel injector 70, and FIG.

3 is an view of part of FIG. 2 viewed from the direction of arrow (P). In these drawings, reference numeral 71 denotes an injector body, and 72 denotes a tip portion which is formed to be separate from the injector body 71. The tip portion 72 is fixed to the injector body 71 by welding, or the like, to join the joining surfaces thereof each other. In the tip portion, a slit-like injection hole 73 is formed. Reference numeral 74 is a valve body, and 75 is a seat portion of the valve body which can be closed by the valve body 74.

A fuel reservoir 76 which communicates with the injection hole 73 is positioned downstream of the seat portion 75. The high pressure fuel is supplied to the fuel reservoir 76 via the seat portion 75 only when the valve body 74 is pulled up by an electromagnetic force or the like, whereby the fuel pressure in the fuel reservoir 76 is increased, and the fuel is injected from the injection hole 73.

An opening on the outer side of the injection hole 73 is in the shape of a curved rectangle with a width (w) larger than a height (h) thereof. The width (w) of the injection hole is gradually narrowed inward so as to inject fuel at a predetermined included angle (TH) in the width direction. On the other hand, the height (h) of the injection hole 73 is nearly uniform in each direction in which the fuel is injected within the predetermined included angle (TH). In the present embodiment, the fuel reservoir 76 generally has a cap shape comprising a hemispherical portion positioned in the injection hole 73 side and a cylindrical portion positioned in the valve body 74 side. The center of the hemispherical portion corresponds to the center of the predetermined included angle (TH). Therefore, the fuel pressure within the fuel reservoir 76 equally acts on each portion of the injection hole 73 in the direction of injection, and thus the fuel injected from the injection hole 73 becomes a flat triangular spray having a relatively small thickness, in which the velocity of injection of the fuel in each direction of injection of fuel is nearly uniform and thus the diffusion degree of the fuel in each direction of injection of the fuel is nearly uniform. Such a flat triangular spray is favorably atomized and mixed as nearly all of the fuel comes into sufficient contact with the intake air within the engine cylinder.

If this fuel injector 70 is used for the direct cylinder injection-type spark-ignition internal combustion engine shown in FIG. 1, when the fuel is injected for a stratified charge combustion in a compression stroke, a flat triangular spray formed by the injected fuel is deflected toward the vicinity of the spark plug 6 by the deflection groove 5a. The spray has a uniform diffusion degree in each direction of injection of fuel so that fuel-air mixture generally having a favorable ignition ability, with no portion excessively rich or lean, is formed on the vicinity of the spark plug 6 and thus a good stratified charge combustion can be realized. Besides, since the fuel spray has a small thickness, a period between the lowest position and the highest position of piston, in which the fuel can be deflected toward the vicinity of the spark plug 6 by the deflection groove 5a, becomes long and thus a relatively large amount of fuel can be injected for this long period and the region of stratified combustion can be expanded toward the high-load side.

Also, if the fuel injector 70 is used for a direct cylinder injection-type spark-ignition internal combustion engine in which the fuel injected in a compression stroke directly forms a fuel-air mixture for a stratified charge combustion on the vicinity of the spark plug, a good stratified charge combustion can be realized without deterioration of combustion by excess rich or lean portions of the fuel-air mixture. Besides, since the fuel spray has a small thickness, and also when the piston is close to the cylinder head, the fuel can be injected to impinge to the piston and thus a relatively large amount of fuel can be injected and the region of stratified combustion can be expanded toward the high-load side.

Also if the fuel injector 70 is used for a direct cylinder injection-type spark-ignition internal combustion engine in which a concave combustion chamber is formed on the upper surface of piston, a good stratified charge combustion can be realized without deterioration of the combustion by excessively rich or lean portions of the fuel-air mixture. Besides, since the fuel spray has a small thickness, a period between the lowest position and the highest position of piston, in which all of the injected fuel can be introduced into the combustion chamber, becomes long and thus a relatively large amount of fuel can be introduced into the combustion chamber for this long period and the region of stratified combustion can be expanded toward the high-load side.

In the fuel injector 70 of the present embodiment, the slit-like injection hole 73 and the downstream portion of the fuel reservoir 76 of a cap shape, for example, a hemispherical portion, are formed in the tip portion 72. The tip portion 72 is separate from the injector body 71. Whereby, even if a production failure of the injection hole in the tip portion 72 occurs, only the tip portion 72 must be thrown away prior to mounting to the injector body 71 and thus the manufacturing cost of the fuel injector 70 does not increase considerably.

Figure 5:
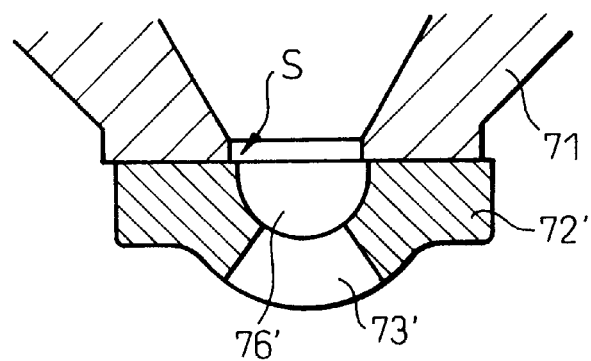
FIG. 5 is an enlarged sectional view illustrating the vicinity of an injection hole of a conventional fuel injector in which the tip portion of the injector body is separate from the injector body.

However, if the tip portion is separate from the injector body, and if the tip portion is conventionally formed, as shown in FIG. 5, with a slight deviation of the tip portion 72' in mounting to the injector body 71, the downstream portion of the fuel reservoir formed in the tip portion 72' does not correspond to the upstream portion thereof formed in the injector body 71, and a step portion (s) is formed within the fuel reservoir 76'. When fuel flows from the upstream portion of the fuel reservoir 76' to the downstream portion thereof, fuel impinges to the step portion (s) within the fuel reservoir 76'.

In the step portion (s) side within the fuel reservoir, a turbulent flow of fuel is produced as the fuel impinges on the step portion, and the pressure of fuel within the downstream portion of the fuel reservoir 76' becomes low. Therefore, even if the injection hole 73' and the downstream portion of the fuel reservoir 76' are favorably formed in the tip portion 72', a uniform pressure of fuel does not act on each direction of injection of fuel in the injection hole. Thus, in the fuel injected from the injection hole 73', the velocity of injection of the fuel in end direction of injection of fuel is not uniform and thus the diffusion degree of the fuel in each direction of injection of the fuel does not become uniform. Therefore, a desired shape fuel spray cannot be formed.

According to the fuel injector 70 of the present embodiment, as shown in FIG. 2, in the joining surfaces of the injector body 71 and tip portion 72, a first opening of the downstream portion of the fuel reservoir formed in the tip portion 71 is made larger than a second opening of the upstream portion of the fuel reservoir formed in the injector body 71, such that the first opening surrounds the second opening. Therefore, even if a slight deviation of the tip portion 72 in mounting to the injector body 71 occurs, a step portion as above-mentioned is not formed and thus a desired shape fuel spray can be formed.

Figure 4:
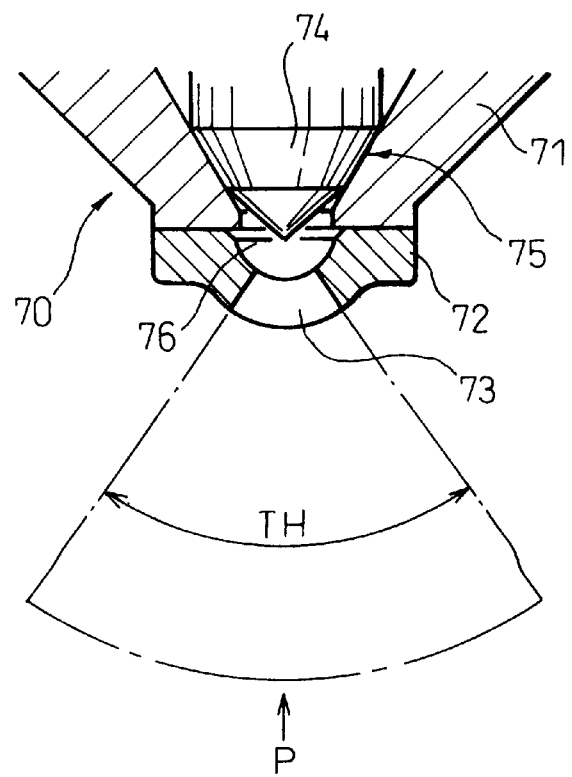
FIG. 4 is an enlarged sectional view illustrating the vicinity of an injection hole of a fuel injector according to a modification of the first embodiment.

In the fuel injector 70 of the present embodiment, the first opening of the downstream portion of the fuel reservoir formed in the tip portion 72 is chamfered with a circular arc section such that the first opening surrounds the second opening of the upstream portion of the fuel reservoir formed in the injector body 71. Thus, by using of the chamfering, the first opening can be easily made larger than the second opening such that the first opening surrounds the second opening, and this constitution can be easily applied to a conventional fuel injector in which the tip portion is separate from the injector body, and does not require a large design change to the conventional fuel injector. The first opening may be chamfered with a bevel section as shown FIG. 4 which illustrates a modification of the first embodiment. In the present embodiment, as above mentioned, the first opening is made larger than the second opening by the chamfering. Therefore, to form a desired fuel spray, the volume of the downstream portion of the fuel reservoir does not become too large and the volume of the upstream portion of the fuel reservoir does not become too small.

In the fuel injector 70 of the present embodiment, a divisional position between the downstream portion formed in the tip portion 72 and the upstream portion formed in the injector body 71 of the cap shape fuel reservoir 76 is made a boundary line between the hemispherical portion and the cylindrical portion of the fuel reservoir 76. However, the divisional position may be positioned in the hemispherical portion of the fuel reservoir or the cylindrical portion thereof.

Figure 6:
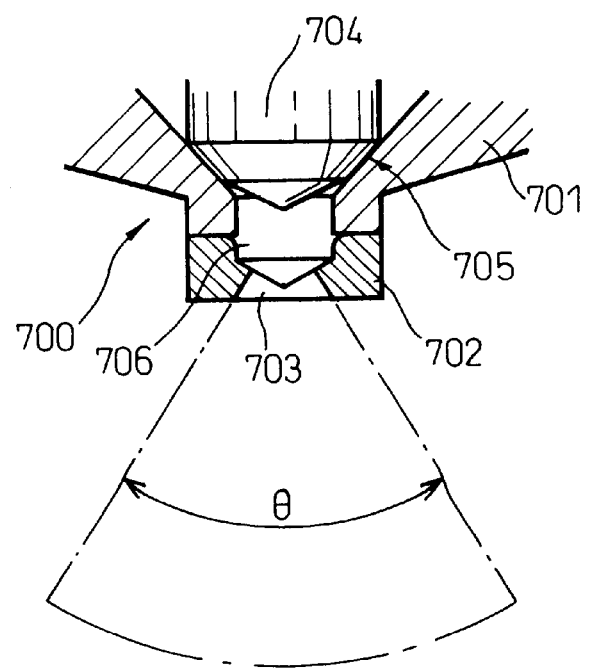
FIG. 6 is an enlarged sectional view illustrating the vicinity of an injection hole of the fuel injector according to a second embodiment of the present invention.

FIG. 6 is an enlarged sectional view illustrating the vicinity of an injection hole of the fuel injector 700 according to a second embodiment of the present invention. In this drawing, reference numeral 701 denotes an injector body, 702 denotes a tip portion which is formed to be separate from the injector body 701, 703 denotes an injection hole, 704 denotes a valve body, 705 denotes a seat portion of the valve body, and 706 denotes a fuel reservoir.

A difference between the fuel injector 700 of the present embodiment and the fuel injector 70 of the first embodiment is that a shape of the fuel reservoir 706 in the injection hole 703 side is not hemispherical but is conical. In particular, the generating line of the conical shape intersects the height center line of the width direction side walls of the injection hole 703 at right angles. Whereby, the fuel pressure within the fuel reservoir 706 acts about equally on each portion of the injection hole 703 in the direction of injection, and thus the fuel injected from the injection hole 703 can form a desired flat triangular spray having a relatively small thickness.

In the present embodiment, a divisional position between the downstream portion formed in the tip portion 702 and the upstream portion formed in the injector body 701 of the fuel reservoir 706 is positioned in the cylindrical portion of the fuel reservoir 706. Of course, the divisional position may be made a boundary line between the conical portion and the cylindrical portion of the fuel reservoir 706, or may be made in the conical portion of the fuel reservoir 706.

Thus, a shape of the fuel reservoir in the fuel injector for forming a flat triangular spray can be any one of various shapes, for example a combination of a pent-roof shape in the injection hole side and a square column shape in the valve body side. The present invention is that in the joining surfaces of the tip portion and the injector body, the first opening of the downstream portion of the fuel reservoir formed in the tip portion is made larger than the second opening of the upstream portion of the fuel reservoir formed in the injector body such that the first opening surrounds the second opening, and can be supplied to a fuel reservoir of any shape.

Although the invention has been described with reference to specific embodiments thereof, it should be apparent that numerous modifications can be made thereto by those skilled in the art, without departing from the basic concept and scope of the invention.

What is claimed is:

1. A fuel injector for an internal combustion engine having a tip portion which is separate from the injector body and in which a slit-like injection hole and a downstream portion of fuel reservoir communicated with said injection hole are formed, the joining surfaces of said tip portion and said injector body being joined to each other, wherein said fuel reservoir is positioned downstream of a seat portion of valve body, an upstream portion of said fuel reservoir is formed in said injector body, a first opening of said downstream portion of said fuel reservoir in said joining surface of said tip portion is chamfered, and said first opening is made larger than a second opening of said upstream portion of said fuel reservoir in said joining surface of said injector body such that said first opening surrounds said second opening.

2. A fuel injector according to claim 1, said first opening being chamfered with a circular arc section.

3. A fuel injector according to claim 1, said first opening being chamfered with a bevel section.

4. A fuel injector according to claim 1, said fuel reservoir having a cap shape comprising a hemispherical portion and a cylindrical portion.

5. A fuel injector according to claim 4, a divisional line between said downstream portion and said upstream portion of said fuel reservoir being a boundary line between said hemispherical portion and said cylindrical portion of said fuel reservoir.

6. A fuel injector according to claim 4, an opening on the outer side of said injection hole having a width larger than a height thereof, said width being gradually narrowed inward at a predetermined included angle, the center of said hemispherical portion of said fuel reservoir corresponding to the center of said predetermined included angle of said injection hole.

7. A fuel injector according to claim 1, said fuel reservoir having a shape comprising a conical portion and a cylindrical portion.

8. A fuel injector according to claim 7, a divisional line between said downstream portion and said upstream portion of said fuel reservoir being positioned in said cylindrical portion of said fuel reservoir.

9. A fuel injector according to claim 7, an opening on the outer side of said injection hole having a width larger than a height thereof, said width being gradually narrowed inward at a predetermined included angle, the generating line of said conical portion of said fuel reservoir intersecting the height center line of the width direction side walls of said injection hole at right angles.

* * * * *